Figure 1:
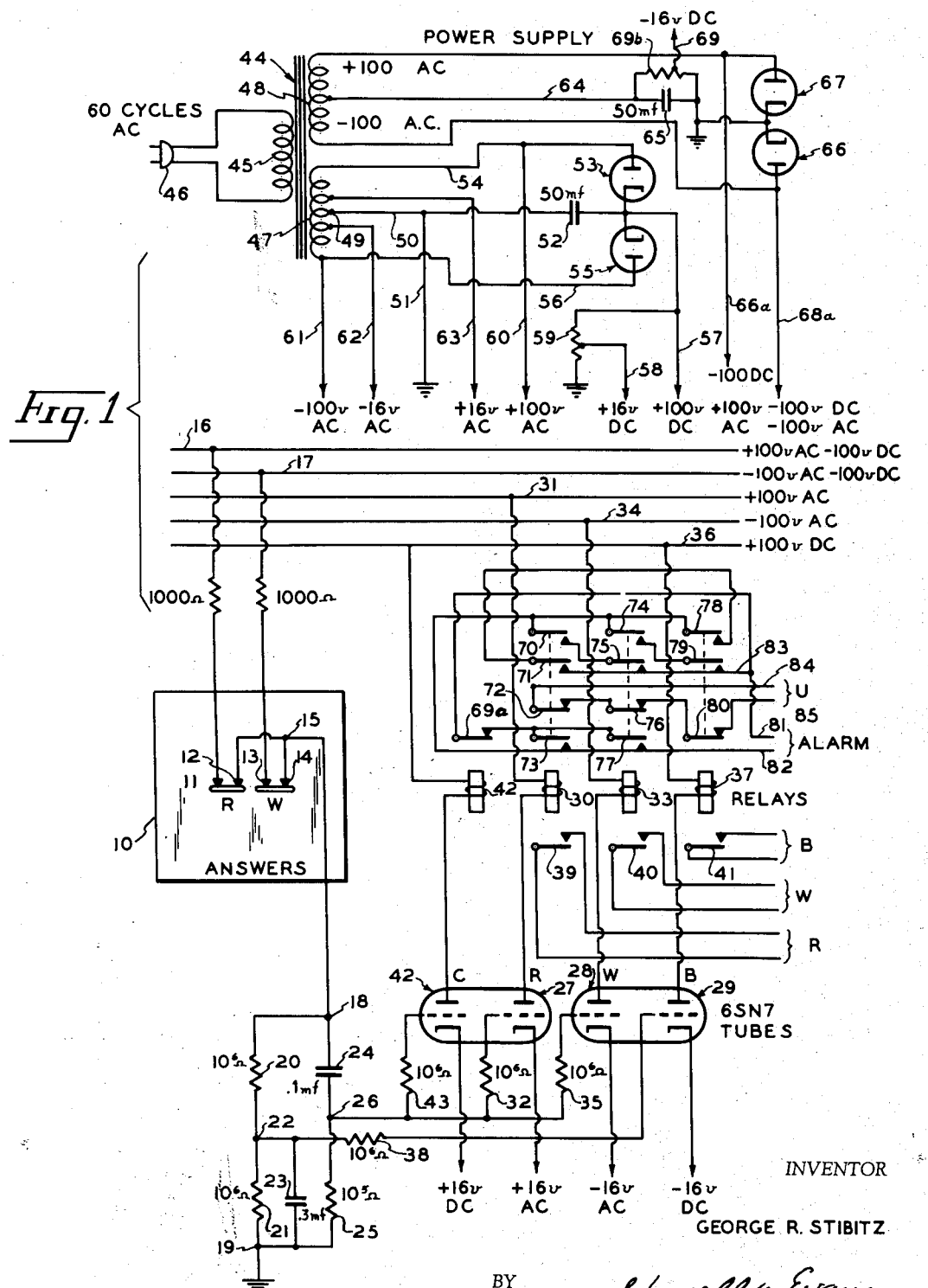

Sept. 13, 1955          G. R. STIBITZ          2,717,460

RECORD CONTROLLED SCORING MACHINE

Filed Nov. 26, 1951          2 Sheets-Sheet 1

INVENTOR
GEORGE R. STIBITZ

BY *Stowell & Evans*

ATTORNEYS

United States Patent Office 2,717,460
Patented Sept. 13, 1955

2,717,460

RECORD CONTROLLED SCORING MACHINE

George R. Stibitz, Burlington, Vt.

Application November 26, 1951, Serial No. 258,148

7 Claims. (Cl. 35—48)

This invention relates to scoring machines and more particularly to record controlled test answer scoring machines wherein answers are indicated on sheets of paper or the like by the entry of marks on the paper which denote by their positions the answer selected. Typically, the marks are entered on the answer sheet or record by the examinee who employs a special pencil that inscribes an electrically conductive mark in the selected position or positions. The answer sheet is then scored in a machine having pairs of spaced contact points corresponding to the several answer positions on the sheet, which contact points are brought into engagement with the sheet. Through appropriate electrical circuits the presence or absence of a mark is indicated and the correctness or incorrectness of the answer is determined and counted or registered.

This type of machine is known in general. In machines of the known type, however, absolute values of the resistances of the marks are utilized in sensing the presence or absence of such marks and the number of such marks as appear on the answer sheet.

Various factors tend to vitiate the results obtained by known scoring machines. For example, where the examinee has made a careless erasure and has marked another response position in the same item, the machine may score both a right and wrong answer for the same item owing to the conductance of the poorly erased mark.

The present invention utilizes the principles of comparing the relative resistances of marks appearing in two response positions in one item ad scoring the answer as if the heavier mark alone were present.

Where a mark or marks in one item are so light that uncertainty exists as to the intention of the examinee, the machine of the present invention will sense the paper as "unscorable."

Where no marks appear in an item, the machine will score the item as blank.

An object of the invention is to provide a scoring machine that automatically scores records with a high degree of accuracy and in which the percentage of "unscorable" answer records is low. Since the "unscorable" papers are graded manually, it is evident that the high degree of accuracy of the present machine minimizes hand grading and increases efficiency.

Another object is to provide a machine of this description that is relatively simple in its circuit arrangement and that incorporates a number of safety features.

The foregoing and other objects and advantages of the invention as may appear hereinafter are realized in a machine of the class described including means for sensing marks on a record, which marks denote intelligence in accordance with their positions on the record and means for comparing the strengths of the marks. Additionally, the machine may include means for indicating intelligence denoted by the marks in accordance with their relative strengths.

In a more detailed form, the machine of the present invention, wherein test answers are scored in accordance with the positions of marks on a sheet or record including a right answer position and a wrong answer position, includes a first pair of spaced contact elements bridging the right answer position, a second pair of spaced contact elements bridging the wrong answer position, conductor means connecting one contact element of each of the pairs of contact elements to a common point, a first source of alternating current, circuit means connecting the source across the first pair of contact elements through the common point, a second source of alternating current having the same frequency as the first source and being out of phase therewith, circuit means connecting the second source across the second pair of contact elements through the common point, first and second vacuum tubes each having a cathode, an anode and a control grid, circuit means connecting the first source of alternating current across the anode and cathode of the first vacuum tube, circuit means connecting the second source of alternating current across the anode and cathode of the second vacuum tube, circuit means connecting the control grids of said vacuum tubes to the common point, and relay devices actuated by the vacuum tubes.

The machine described in the immediately preceeding paragraph provides for the scoring of right or wrong answers. There may also be included in such a machine, devices for scoring a paper as blank where no marks appear in an item and for scoring a paper "unscorable" that is neither right, wrong nor blank. Such devices will be described in detail hereinafter.

Figure 2:
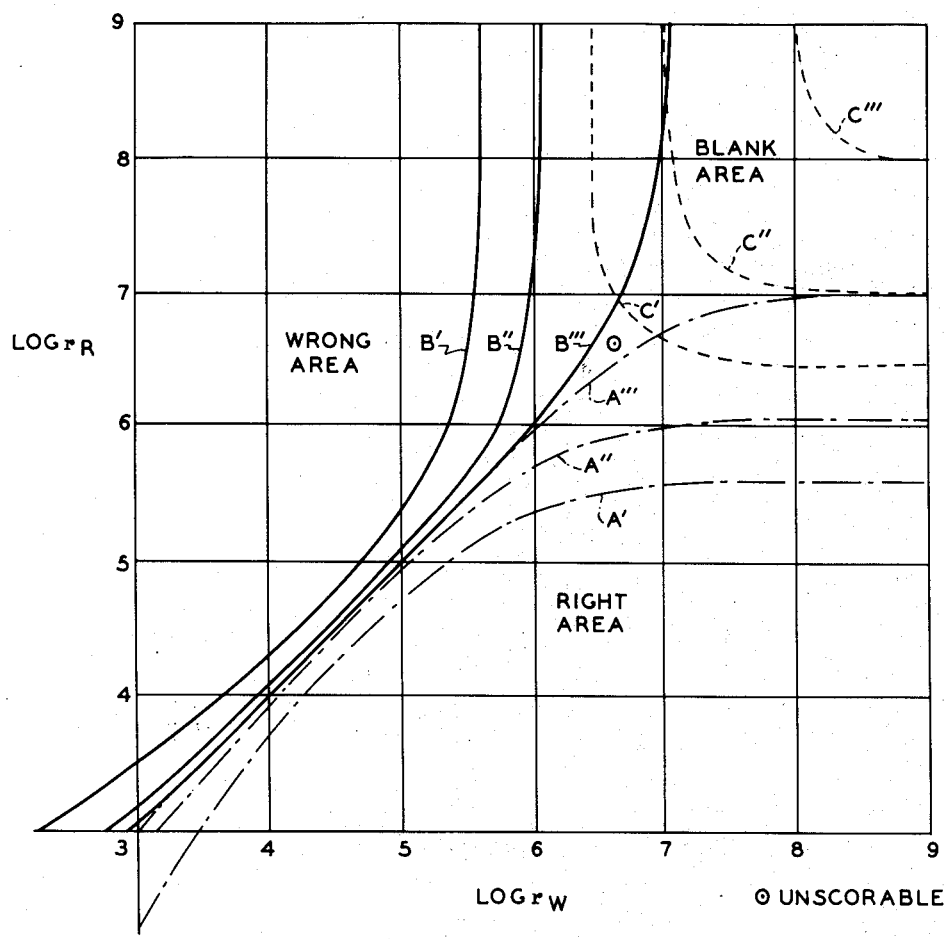

The invention will be further described with greater particularity, and other of its aims and advantages will be apparent from or pointed out in the following detailed description of one embodiment of the invention as shown in the drawings wherein:

Fig. 1 is an electrical circuit diagram illustrating one form of test answer scoring machine in accordance with the invention; and Fig. 2 is a graph showing typical vacuum tube operation in the apparatus of Fig. 1 as controlled by the resistances of marks appearing on an answer sheet.

Referring to the drawings, particularly to Fig. 1 thereof, the diagram of a test scoring machine as shown includes an answer sheet 10 that may be a paper sheet or any other suitable record material having, for purposes of illustration, an elongated area R in which a conductive pencil mark or other conductive mark is placed if the answer is considered to be right. If the answer is considered to be wrong, the mark is placed in the area W.

A pair of spaced contact points 11, 12 are arranged to be pressed against the area R to complete a circuit between the points through the area. Similarly, a second pair of contact points 13, 14 are arranged to be simultaneously pressed against the area W. One contact point of each pair of points, for example the contacts 12 and 14, are connected by wires to a common terminal 15.

The contact point 11 is connected through a 1000 ohm current limiting or protective resistor to a line wire 16 supplied with two potentials, namely +100 v. A. C. and −100 v. D. C. The contact point 13 is connected to a line wire 17 supplied with potentials of −100 v. A. C. and −100 v. D. C. The A. C. voltages are sine voltages and the plus and minus signs preceeding the A. C. voltage designations indicate that the voltages are out of phase, more particularly 180° out of phase. An exemplary power supply for providing the necessary operating voltages will be described hereinafter.

The common point 15 is grounded through a divider network having an upper terminal 18 and a grounded terminal 19. It will be understood that one side of the power supply is also grounded so that circuits through the answer positions R and W and the divider network are completed.

The divider network has two principal paths to ground. One, a direct current path, has two series resistors 20 and 21 each having a resistance of $10^6$ ohms. These resistors form a voltage divider having a center tap 22. The separate values of resistors 20 and 21 are chosen to provide a proper biasing potential at the center tap 22 for driving a vacuum tube in a manner to be explained hereinafter. Resistor 21 is by-passed by a 0.3 mf. condenser 23 for shunting alternating currents to ground. Thus, a substantially pure D. C. potential is developed across the resistor 21.

The second path is in parallel with the first and is an alternating current path. It has a 0.1 mf. condenser 24 connected in series with a $10^5$ ohm resistor 25. The condenser 24 blocks passage of direct current and passes freely alternating current of the frequency employed, thus effecting a substantial separation of direct and alternating currents. The potential developed across the resistor at the tap 26 is of substantially pure alternating character.

In order to score right, wrong and blank answers, the apparatus is provided with three vacuum tubes 27, 28 and 29, each having an anode, a cathode and a control grid denoted by conventional symbols. By way of illustration, double tubes of type 6SN7 are shown.

Tube 27 senses right answers. Its anode is connected through a relay 30 to a line wire 31 carrying +100 v. A. C. that is in phase with the alternating current carried by line wire 16. The cathode is returned to +16 v. A. C. that is in phase with the anode potential. The control grid of tube 27 is connected to the divider network terminal 26 through a grid resistor 32 having a resistance of $10^6$ ohms.

Tube 28 senses wrong answers. The anode is connected through a relay 33 to a line wire 34 carrying −100 v. A. C. that is 180° out of phase with the alternating current in the line wires 16 and 31 and is in phase with the alternating current component of line wire 17. The cathode of tube 28 is returned to −16 v. A. C. that is in phase with the voltage applied to the tube anode. The control grid of tube 28 is also connected to the network terminal 26 through a $10^6$ ohm resistor 35.

Tube 29, that senses blank answers, has an operating potential of 116 volts impressed thereacross, the anode being connected to line wire 36 at a potential of +100 v. D. C. this through a relay 37, and the cathode being returned to −16 v. D. C. The control grid of tube 29 is connected to the divider network terminal 22 through a $10^6$ ohm grid resistor 38.

When the right answer tube 27 is conductive, relay 30 is energized to close normally open switch 39 energizing a counter circuit or other appropriate circuit to indicate a right answer. Similarly, when tube 28 is conductive, relay 33 closes switch 40 to energize a counter or the like indicating a wrong answer. A blank paper is likewise indicated when tube 29 is conductive; then relay 37 closes switch 41 to energize the blank indicating circuit.

In order to complete the description of operating circuits, the check tube will be described briefly. This tube 42 is a triode. The anode is connected to the +100 v. D. C. line wire 36 through a relay 42 and the cathode is returned to +16 v. D. C. The control grid is connected to the divider network terminal 26 through a $10^6$ ohm resistor 43. The check tube is not directly involved in the scoring operations of the machine; instead it serves as a safety feature as will be explained more fully hereinafter.

The power supply shown at the top of Fig. 1 is exemplary of a suitable power supply for the machine. It includes a power transformer 44 having a primary winding 45 connected through a plug 46 to a source of alternating current (not shown), for example ordinary 60 cycle 115 volt domestic current. The transformer has two secondary windings 47 and 48.

Secondary winding 47 has a center tap 49 grounded through wires 50 and 51 and also connected to one side of a 50 mf. storage condenser 52. The upper end of winding 47 is connected to the plate of a diode rectifier tube 53 through a wire 54 and the lower end is similarly connected to the plate of a second diode rectifier tube 55 through a wire 56. The cathodes of diodes 53 and 55 are connected in common to the ungrounded side of the storage condenser 52. This arrangement provides a direct current source across the storage condenser 52 between ground and the +100 v. D. C. output wire 57.

A +16 v. D. C. potential is available at the output wire 58 that taps this voltage from the resistor 59 that drops the +100 v. D. C. potential of wire 57 to ground.

A source of +100 v. D. C. is available in the upper half of the secondary winding 47 and this current is delivered to the output wire 60. Also, the lower half of winding 47 provides −100 v. A. C. in the output wire 61. The winding 47 is appropriately tapped to make available −16 v. A. C. in the output wire 62 and +16 v. A. C. in the output wire 63.

The center tap of winding 48 is connected through a wire 64 to one side of a 50 mf. storage condenser 65, the other side of the storage condenser being grounded and also connected to the common cathode terminal of diode rectifiers 66 and 67. The anode of rectifier 67 is connected to the upper end of transformer winding 48 and the anode of rectifier 66 is connected to the lower end of winding 48. At the upper terminal of winding 48 the A. C. and D. C. components appear and are available in the output wire 66a as −100 v. D. C. +100 v. A. C. At the lower terminal of winding 48 and A. C. voltage 180° out of phase with the A. C. voltage at the upper terminal is found. This A. C. component and the D. C. component are delivered to the output wire 68a as −100 v. D. C. −100 v. A .C.

A potential of −16 v. D. C. is delivered at power supply output wire 69 that is tapped into resistor 69b connected across the storage condenser 65.

Connections from the output wires of the power supply to the input terminals of the scoring machine proper are believed to be obvious. Suitable manually operated or automatically operated switches (not shown) may be provided in the power circuits so that the circuits may be energized after the contact points 11 to 14 are pressed into engagement with a paper to be scored.

With the foregoing description in mind, the qualitative principles of operation of the scoring machine of Fig. 1 can be considered. After pressing the contact points 11 to 14 into registering engagement with the answer sheet 10, the operating circuits are energized.

In the exemplary case, the resistance of blank paper between the contacts 11 and 12 or 13 and 14 is about $10^7$ ohms while the resistance of an intentional mark between complementary contacts is $10^6$ ohms or less.

In the case where an intentional mark appears in the area R of answer sheet 10 and the area W is blank, the machine should score the item as right. That is to say that the relay 30 should be energized to operate the right scoring switch 39 and the relays 33 and 37 should be deenergized. Owing to the difference in resistance of the paths R and W, predominating signals will flow through the path R that is marked with conductive pencil or the like. The predominating signals will consist of the A. C. and D. C. components of line wire 16 as dropped through the several impedances to ground at the network terminal 19. An A. C. signal in phase with the operating potential of tube 27 will be developed at network terminal 26, which signal is applied to the grid of tube 27 through the resistor 32. Since the driving signal on the grid is in phase with the operating potential, the tube conducts on the positive half-cycle and the relay 30 is energized to close the right answer actuating switch 39.

The same signal is simultaneously applied to the grid of tube 28. However, because the control signal is out of phase with the plate potential of tube 28, this tube will not conduct on either half-cycle and the relay 33 remain deenergized.

A negative D. C. potential is developed at network terminal 22 which potential is applied through the resistor 38 to the grid of tube 29. The tube is thus biased to or beyond cut-off and does not conduct. Thus relay 37 remains deenergized.

In the case where an intentional conductive mark appears only in the W area of the sheet 10, the machine should score the answer as wrong. To do this, relay 33 should be energized and relays 30 and 37 should be deenergized.

The predominant signal is obtained from the line wire 17, since the W area is more conductive than the R area of the answer sheet. The predominant A. C. signal developed at network terminal 26 is applied to the grid of tube 28 in phase with the plate potential of tube 28 and to the control grid of tube 27 out of phase with the plate potential of tube 27. Therefore, tube 28 conducts and tube 27 is non-conductive. Relay 33 closes switch 40 to actuate the wrong counter circuit.

The D. C. potential developed at network terminal 22 is the same as that developed in the case of the right answer considered hereinbefore and is applied to the grid of tube 29 to prevent the tube from conducting.

Where both the R and W areas are blank, the machine should score the paper as blank. To do this, relay 37 should operate and relays 30 and 33 should remain inoperative. Due to the relatively high resistance of the blank areas, insufficient direct current is conducted therethrough to provide a D. C. potential at network terminal 22 low enough to cut off the normally conductive tube 29 and this tube conducts actuating relay 37 and blank scoring switch 41. The A. C. components flowing through R and W are low, about equal in magnitude and 180° out of phase. Hence, these A. C. components cancel each other and no driving potential is applied to the grids of tubes 27 and 28. These tubes, being normally non-conductive, remain so, and the corresponding relays 30 and 33 remain inoperative.

The check tube 42 is normally conductive. D. C. potentials developed in the divider network do not influence its operation. Since the operating plate voltage is a D. C. voltage, tube 42 will also conduct with any A. C. grid voltage applied to it from the network terminal 26 on the positive half-cycle. Hence, the check tube conducts simultaneously with each of the tubes 27, 28 or 29 to open the switch 69a.

Accidental operation of either tube 27 or 28, or their corresponding relays, without simultaneous operation of the check relay 42 will cause an alarm. This action is readily followed in Fig. 1 wherein relay 30 is shown as operating ganged switches 70, 71, 72 and 73, relay 33 is shown as operating ganged switches 74, 75, 76 and 77, and relay 37 is shown as operating ganged switches 78, 79 and 80.

If tube 27 operates without simultaneous operation of check tube 42, switch 69a remains closed and switch 73 closes, thus completing the alarm circuit from wire 81 to wire 82 through switches 69a and 73. Similarly, if tube 28 operates without simultaneous operation of tube 42, switch 77 is closed and the alarm circuit is completed through switches 69a and 77.

The accidental operation of any two of the relays 30, 33 and 37 will signal the alarm. If relays 30 and 33 operate together, switches 70 and 75 are closed and the alarm circuit is completed from wire 81 to wire 82 through wire 83, switch 75 and switch 70. If relays 33 and 37 operate together, switches 74 and 79 are closed and the alarm circuit is completed from wire 81 to wire 82 through wire 83, switch 79 and switch 74. And, if relays 30 and 37 operate simultaneously, switches 71 and 78 close and the alarm circuit is completed from wire 81 to wire 82 through wire 83, switch 71 and switch 78. The alarm circuits are completed in such ways regardless of the condition of check switch 69a.

If an answer sheet is neither right, wrong, nor blank the machine grades it unscorable. Under these conditions, relays 30, 33 and 37 are deenergized, switches 72, 76 and 80 remain closed and the unscorable circuit 84, 85 is energized. The paper undergoing grading, is removed from the machine, either manually or automatically, and is scored by an operator. Referring to Fig. 2, the graph represents all possible combinations of resistances R and W where the $\log_{10}$ of the resistances in ohms ranges from 3 to 9. The log of the resistance of the W path on the answer sheet is plotted parallel to the abscissa and the log of the resistance of the R path is plotted parallel to the ordinate.

The families of curves designated A and B with superscripts relate to A. C. voltages developed at the network terminal 26 of Fig. 1. Points on any one of the A family of curves define values of R and W that provide the same A. C. potential at the network terminal 26 when the A. C. signal through R predominates over the A. C. signal through W. Curve A' represents a more positive voltage than curve A'' which in turn represents a more positive voltage than the curve A'''. Absolute values of these voltages will depend upon the absolute values of the voltage drops through the answer sheet and network and the absolute and relative values of the A. C. impedances in the circuit. These are the resultant potentials that operate the right answer tube 27 of Fig. 1. If this tube cuts off at voltage A', voltages more positive than A' will cause the tube to conduct. Therefore, resistances of R and W corresponding to points in the area designated "Right Area" on the chart of Fig. 2 will cause operation of the right answer tube and score the item as correct. This tube may be balanced to provide cut off points corresponding to voltages A', A'' or A''', for example.

Points on any one of the B family of curves define values of R and W that provide the same A. C. potential at the network terminal 26 when the A. C. signal through W predominates over the A. C. signal through R. Of these curves, curve B' corresponds to a more positive voltage than curve B'' which, in turn, corresponds to a more positive voltage than curve B'''. Therefore, resistances of R and W defining points in the area marked "Wrong Area" on the chart will cause operation of the wrong answer tube 28 of Fig. 1 and score the item as incorrect.

Points on any one of the family of curves designated C define values of R and W that provide the same D. C. potential at the network terminal 22 of Fig. 1. Curve C' represents a more positive voltage than C'' which, in turn, represents a more positive voltage than C'''. This voltage controls operation of the blank tube 29 of Fig. 1 and the tube may be balanced as to become non-conductive when the voltage at network terminal 22 is more negative than the cut-off voltage represented by curve C', for example. Absolute values of these voltages are a matter of engineering design and depend upon the D. C. voltage drops through the answer sheet and network and the absolute and relative values of the resistances in the circuit. It will therefore be seen that where the resistances of R and W correspond to points in the area of Fig. 2 designated "Blank Area," the blank tube 29 of Fig. 1 will operate to score the item as blank.

The tubes may be initially balanced to cut off at voltages corresponding, respectively, to curves A', B', and C' which may be considered as one set of operating conditions. Curves A'', B'' and C'' correspond to a second set of operating conditions and curves A''', B''' and C''' correspond to still a third set.

In the "Unscorable Area" of Fig. 2 that lies between curves A', B' and C', for example, none of the tubes 27, 28 and 29 is conductive, and for values of R and W falling in this area, the item is scored unscorable by the circuit 84—85 of Fig. 1, as explained hereinbefore.

The curves of Fig. 2 are readily plotted with reference to the apparatus of Fig. 1 by application of Ohm's law and Kirchoff's laws of electric networks.

The foregoing specific example of the invention is but a concrete embodiment of the broad principles thereof. A variety of modifications falling within the purview and scope of the invention will occur to those skilled in the art in the light of this description. Comparison of the relative strengths of the marks on the answer sheet for the purpose of scoring right or wrong can be accomplihsed in a single circuit or in separate circuits. The means for scoring in accordance with the stronger of the marks or differentiating as between them in accordance with mark strengths can employ frequency or polarity differentiating means as well as the phase differentiating means of the embodiment shown and described herein.

The principles of the invention may be employed to score papers marked with other than electrically conductive marks. For example, optically visible or magnetically charged marks may be compared for relative strength. A plurality of items may be scored simultaneously by employing a plurality of the circuits.

For purposes of illustration, the invention has been described with reference to the simplest case where an item to be scored has only one right answer position and one wrong answer position. If the item to be scored involves the choice of one correct answer position out of three or more possible answer positions, the plurality of complementary wrong answer contact points are connected in parallel so that a mark appearing in any of the plurality of wrong answer positions is scored wrong. Also, if there are two or more possible right answer positions in an item, the complementary contact points corresponding to these positions may be connected in parallel so that a mark in any of the possible positions will result in scoring the item right. Moreover, in some situations it is desired that two or more of a plurality of mark positions in an item be marked in order for the item to be considered right; in this situation, the complementary contact points corresponding to these two or more positions are connected in series so that marks must be made in all of series connected positions if the machine is to score the item right. The terms "right answer" and "wrong answer" are used in the specification and claims to designate responses which are given a positive score and a negative score respectively and have no further implication.

From the foregoing description, it will be seen that the present invention provides a scoring machine that fully accomplishes the objects of the invention.

I claim:

1. In a machine of the class described, wherein test answers are scored in accordance with the positions of marks on a sheet including a right answer position and a wrong answer position, a first pair of spaced contact elements bridging the right answer position, a second pair of spaced contact elements bridging the wrong answer position, circuit means connecting one contact element of each of said pairs of contact elements to a common point, a first source of current, circuit means connecting said source across said first pair of contact elements through said common point, a second source of current, circuit means connecting said second source across said second pair of contact elements through said common point, a pair of relay devices, and circuit means operatively connecting said relay devices to said common point including means operating said relay devices selectively in accordance with the potential developed at said common point.

2. In a machine of the class described wherein test answers are scored in accordance with the positions of marks on a sheet including a right answer position and a wrong answer position, a first pair of spaced contact elements bridging the right answer position, a second pair of spaced contact elements bridging the wrong answer position, circuit means connecting one of each of said pairs of contact elements to a common point, a divider network including a resistor and a capacitor connected in parallel, a first source of alternating current, a second source of alternating current having the same frequency as the first source and being out of phase therewith, a source of direct current, circuit means connecting said first source of alternating current across said first pair of contact elements through said divider network, circuit means connecting said second source of alternating current across said second pair of contact elements through said divider network, circuit means connecting said source of direct current across both of said pairs of contact elements through said divider network, first, second and third vacuum tubes, each said tube having at least a cathode, an anode and a control grid, circuit means connecting said first source of alternating current across the anode and cathode of said first vacuum tube, circuit means connecting said second source of alternating current across the anode and cathode of said second vacuum tube, circuit means connecting said source of direct current across the anode and cathode of said third vacuum tube, circuit means connecting the control grids of said first and second vacuum tubes to a point of alternating current potential in said divider network, circuit means connecting the control grid of said third vacuum tube to a point of direct current potential in said divider network, and relay devices actuated by said vacuum tubes.

3. In a machine as defined in claim 2, a fourth vacuum tube having at least a cathode, an anode and a control grid, circuit means connecting said source of direct current across the anode and cathode of said fourth vacuum tube, circuit means connecting the control grid of said fourth vacuum tube to a point of direct current potential in said divider network, and a relay device actuated by said fourth vacuum tube.

4. In a machine of the class described wherein test answers are scored in accordance with the positions of marks on a sheet including a right answer position and a wrong answer position, a first pair of spaced contact elements bridging the right answer position, a second pair of spaced contact elements bridging the wrong answer position, circuit means connecting one contact element of each of said pairs of contact elements to a common point, a first source of alternating current, circuit means connecting said source across said first pair of contact elements through said common point, a second source of alternating current having the same frequency as the first source and being out of phase therewith, circuit means connecting said second source across said second pair of contact elements through said common point, first and second vacuum tubes, each said tube having at least a cathode, an anode and a control grid, circuit means connecting said first source of alternating current across the anode and cathode of said first vacuum tube, circuit means connecting said second source of alternating current across the anode and cathode of said second vacuum tube, circuit means connecting the control grids of said vacuum tubes to said common point, and relay devices actuated by said vacuum tubes.

5. In a machine for scoring a record sheet having a plurality of marking positions for each item to be scored, whereby a mark made in one or more of said positions corresponds to a right answer and marks in any others of said positions correspond to a wrong answer, means for sensing the presence and intensity of marks in the respective positions to produce a signal for each said position related to the intensity of said marks, means for comparing the intensities of said signals to derive a composite output signal related to the difference in intensity between right answer signals and wrong answer signals for each said item to indicate the answer as right or wrong in accordance with the magnitude and source of said difference.

6. The invention as defined in claim 5 and further means actuated in accordance with the value of said composite signal to indicate the answer as blank when the magnitude of said composite signal is less than a predetermined value.

7. The invention as defined in claim 6 and further means actuated in accordance with the value of said composite signal to indicate the answer as unscorable when the magnitude of said composite signal is intermediate said predetermined value and a second and higher predetermined value.

References Cited in the file of this patent

UNITED STATES PATENTS

| | | |
|---|---|---|
| 2,010,653 | Warren | Aug. 6, 1935 |
| 2,150,256 | Warren | Mar. 14, 1939 |
| 2,325,958 | Johnson | Aug. 3, 1943 |